US012663336B2

(12) United States Patent
Liang

(10) Patent No.: US 12,663,336 B2
(45) Date of Patent: Jun. 23, 2026

(54) OPTICAL WAVEFRONT MEASURING DEVICE AND MEASURING METHOD THEREOF

(71) Applicant: National Central University, Taoyuan City (TW)

(72) Inventor: Chao-Wen Liang, Taoyuan City (TW)

(73) Assignee: National Central University, Taoyuan City (TW)

( * ) Notice: Subject to any disclaimer, the term of this patent is extended or adjusted under 35 U.S.C. 154(b) by 148 days.

(21) Appl. No.: 18/368,004

(22) Filed: Sep. 13, 2023

(65) Prior Publication Data

US 2024/0085268 A1    Mar. 14, 2024

Related U.S. Application Data

(60) Provisional application No. 63/406,333, filed on Sep. 14, 2022.

(51) Int. Cl.
*G01M 11/02*          (2006.01)

(52) U.S. Cl.
CPC ............................... *G01M 11/0214* (2013.01)

(58) Field of Classification Search
CPC ......... G01M 11/0242; G01M 11/0235; G01M 11/02; G01M 11/0214; G01M 11/064; G01M 11/30; G01M 11/31; G01M 11/85; G01M 11/86
USPC ................................. 356/124, 138, 128, 517
See application file for complete search history.

(56) References Cited

U.S. PATENT DOCUMENTS

| | | | | |
|---|---|---|---|---|
| 5,309,214 A | * | 5/1994 | Hashimoto | .......... G01N 21/412 356/73.1 |
| 8,174,670 B2 | * | 5/2012 | Tezuka | .................... G03F 7/706 355/67 |
| 2005/0105044 A1 | * | 5/2005 | Warden | .............. G01M 11/0235 351/159.08 |
| 2008/0273200 A1 | * | 11/2008 | Kakuchi | ............. G03F 7/70566 356/364 |
| 2012/0241989 A1 | * | 9/2012 | Sugimoto | .............. G01N 21/45 356/128 |
| 2013/0221238 A1 | * | 8/2013 | Li | ........................... G01B 11/06 250/459.1 |
| 2013/0307965 A1 | * | 11/2013 | Widman | ................ G01M 11/02 348/135 |
| 2014/0009765 A1 | * | 1/2014 | Sugimoto | .............. G01N 21/41 264/2.6 |
| 2016/0161403 A1 | * | 6/2016 | Sugimoto | .......... G01M 11/0228 356/124 |
| 2018/0073957 A1 | * | 3/2018 | Sato | ................... G01M 11/0214 |
| 2019/0047084 A1 | * | 2/2019 | Okuma | .............. B23K 26/0648 |
| 2019/0242781 A1 | * | 8/2019 | Rosen | .................. G01N 21/958 |

* cited by examiner

*Primary Examiner* — Isiaka O Akanbi

(74) *Attorney, Agent, or Firm* — WPAT, PC

(57)          ABSTRACT

A device and method for measuring the decentration of optics under test is provided. The device comprises a rotational spindle for loading and rotating the optics under test, a light source module for providing incident light beam to the optics under test, and a wavefront sensor for receiving testing light beams with different exposures from the optics under test at a plurality of azimuthal directions.

17 Claims, 10 Drawing Sheets

120a

| Moving a light source module to a first pre-determined position and moving a wavefront sensor to a second pre-determined position | S1 |

| Providing the incident light beam to be incident on the optics under test, by the light source module. When the optics under test is rotated to a plurality of azimuthal directions different from each other by the rotational spindle, a testing light beam adapted to exit from the optics under test rotated to the plurality of azimuthal directions different from each other is generated. The testing light beam is received and a plurality of camera frames with different exposures are obtained by the wavefront sensor | S2 |

| Obtaining a measured image from the camera frames and generating a measured wavefront phase or measured ray slopes from the measured image | S3 |

FIG. 8

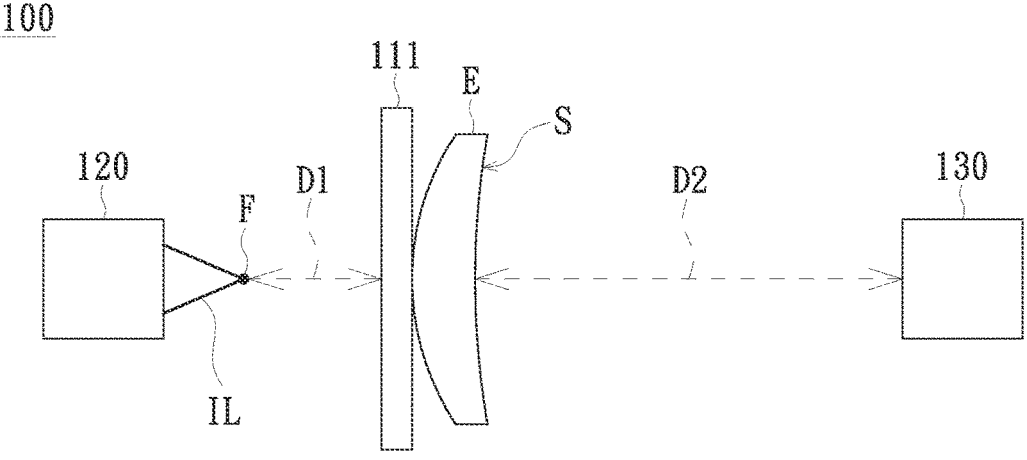

FIG. 9

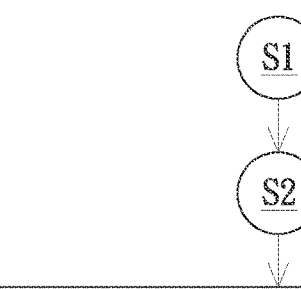

S1

S2

Camera images with different exposures may be achieved by modulating a light intensity of the incident light beam of the light source module    S3
   S31

FIG. 10

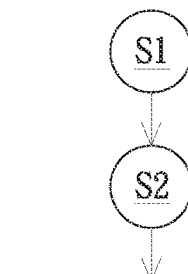

S1

S2

Camera images with different exposures may be obtained by setting the wavefront sensor to capture the camera frames with different shutter times    S3
   S32

FIG. 11

S1

Aligning the optical axis of the optics under test with the rotation axis of the rotational spindle    S21

S2

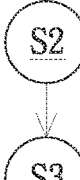

Determining an optimum optical conjugate position according to a design prescription of the optics under test by ray tracing ⎯ S01

Determining the first pre-determined position and the second pre-determined position of the wavefront sensor and the light source module relative to the optics under test in a third direction parallel to the rotation axis according to the optimum optical conjugate position ⎯ S02

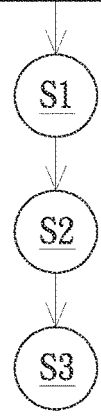

Determining an optimum optical conjugate position according to a design prescription of the optics under test by ray tracing software ⎯ S01

Generating a reference wavefront phase or reference ray slopes in a micro lens array plane of the wavefront sensor ⎯ S011

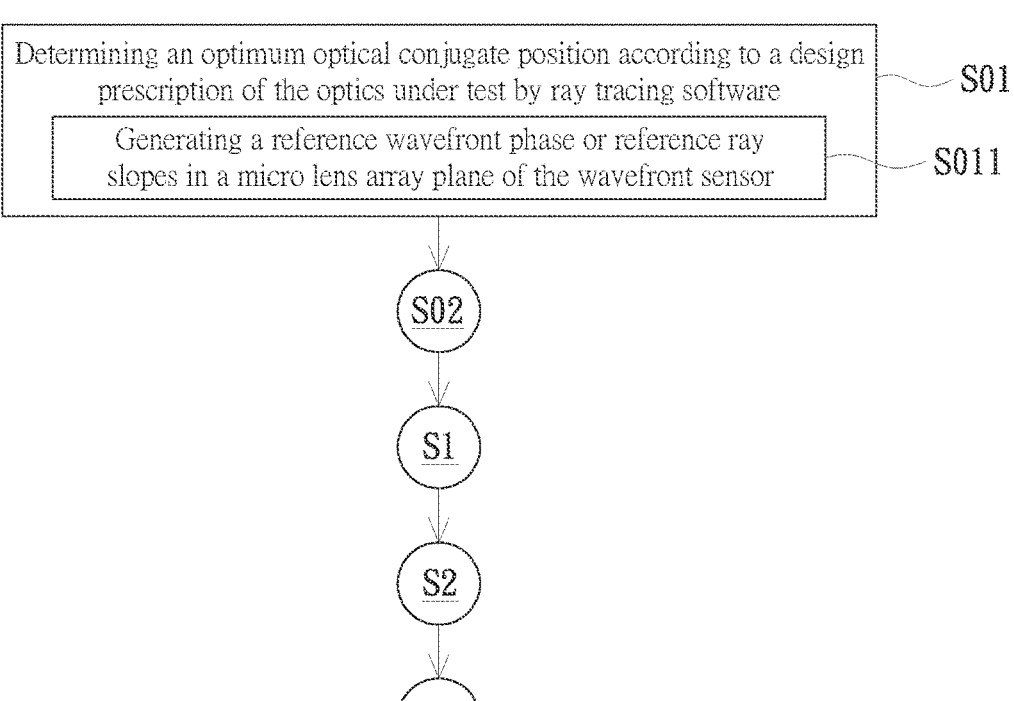

S01

Determining a numerical aperture of the incident light beam according to the optimum optical conjugate position of the optics under test, selecting an appropriate converging lens or an aperture to be disposed between a light emitting element and the optics under test through the numerical aperture, and adjusting the first pre-determined position of the converging lens in the third direction parallel to the rotation axis according to the optimum optical conjugate position — S013

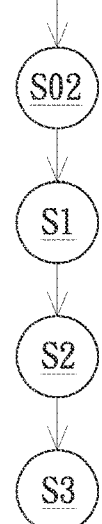

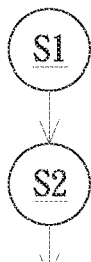

S1

S2

Driving a lens holder to move along a first direction and a second direction by a translation stage, the first direction and the second direction being perpendicular to the rotation axis and each other — S21 — S211

OPTICAL WAVEFRONT MEASURING DEVICE AND MEASURING METHOD THEREOF

FIELD OF THE INVENTION

The invention relates to an optical measuring device, and in particular to an optical wavefront measuring device applied to the measurement of an optics under test, and a measuring method thereof.

BACKGROUND OF THE INVENTION

At present, there are several methods to measure optical surfaces, one of which is probe metrology. The probe metrology uses a probe to measure a surface profile of an optical lens. If both optical surfaces of an optical lens are measured with the probe, the profile of both surfaces, decentration and tilt between the two optical surfaces can be obtained. However, because the measuring probe contacts upon the measured surface, it may cause damage to the optics under test, and the measurement process can be time-consuming. Another common measurement method is Fizeau interferometry with Computer Generated Hologram (CGH). Traditional Fizeau interferometry is used to measure a spherical optical surface or minimum aspherical surface. If the asphericity of the surface is too large, it is impossible to measure its interference fringes, as a result, CGH is needed. The function of CGH is to convert a light beam emitted by the interferometry into an incident wavefront to compensate a wavefront aberration of the ideal optics under test, allowing the interferometer to measure aberrations caused by the manufacturing of the optics under test (decentration, surface curvature error, etc.). However, CGH is a specialized optical element and needs to be custom designed and manufactured before usage. The design and manufacturing processes of CGH is usually time-consuming and costly. In addition, CGH has very strict requirements for its optical alignment process, so that measurement with CGH is usually used for one of a kind optics with high unit price.

Although the dynamic range of a traditional wavefront sensor is higher than that of the interferometry, the traditional wavefront sensor still has a limited dynamic range when measuring an aspheric aberration, so that it is still difficult to measure an aspheric wavefront. If CGH is used to assist in the measurement, similar problems will be encountered as those of the Fizeau interferometry with CGH assistance. As a result, a better optical testing method is desired to overcome the aforementioned difficulties.

SUMMARY OF THE INVENTION

In this invention, an optical wavefront measuring device is proposed for measuring and an optics under test. Wherein the optics under test may be an optical lens, an optical mirror or an optical module composed of multiple optical elements. The device comprises a rotational spindle for loading and rotating the optics under test to a plurality of azimuthal directions, a light source module for providing an incident light beam to the optics under test and generating a testing light beam emitted from the optics under test, and a wavefront sensor for acquiring one or more camera frames with different exposures when the optics under test at a plurality of azimuthal directions.

In this invention, an optical wavefront measuring method is proposed for qualifying the decentration of optics under test. The method involves obtaining measured images at different azimuthal directions through High Dynamic Range imaging (HDR imaging) of camera frames obtained at different exposures by the optical wavefront measuring device. The measured wavefront phases and ray slopes at different azimuthal directions are analyzed to classify aberrations that change with the azimuthal direction as the correlated aberrations of the optics under test. In the end, the decentration of the optics under test is determined by analyzing the reference wavefront phase obtained through ray tracing method.

BRIEF DESCRIPTION OF THE DRAWINGS

FIG. 8 is a flow diagram of an optical wavefront measuring method according to an embodiment of the invention.

FIG. 9 is a schematic diagram of an optical wavefront measuring device suitable for the optical wavefront measuring method of FIG. 8.

FIG. 10 is a flowchart of step S3 of the optical wavefront measuring method of FIG. 8.

FIG. 11 is a flow diagram of step S3 of an optical wavefront measuring method according to another embodiment of the invention.

FIG. 12 is a flow diagram of an optical wavefront measuring method according to another embodiment of the invention.

FIG. 13 is a flow diagram of an optical wavefront measuring method according to another embodiment of the invention.

FIG. 14 is a flowchart of step S01 of the optical wavefront measuring method of FIG. 13.

FIG. 16 is a flow diagram of an optical wavefront measuring method according to another embodiment of the invention.

FIG. 17 is a flowchart of step S21 of the optical wavefront measuring method of FIG. 12.

DETAILED DESCRIPTION OF PREFERRED EMBODIMENTS

In aspheric optical measuring technology, an incident light beam (IL in FIG. 1) passing through an optics under test (E in FIG. 1) may produce optical aberrations such as spherical aberration, resulting in non-uniform light beam intensity. This is why a traditional wavefront sensor is not suitable for measuring aspheric wavefronts. To address this issue, a wavefront measuring technology with high dynamic range imaging (HDR Imaging) can be used to obtain the optical aberrations in aspheric wavefront with non-uniform light intensity. This technology can overcome the shortcomings of overexposure of Hartmann spots in the center of the light beam and underexposure of the edge that frequently occur in a general wavefront sensor, can accurately obtain the imaging characteristics of the Hartmann spots with different light intensities, and accurately synthesize camera frames with different exposures into Hartmann spot measured images with a high dynamic range.

Figure 1:
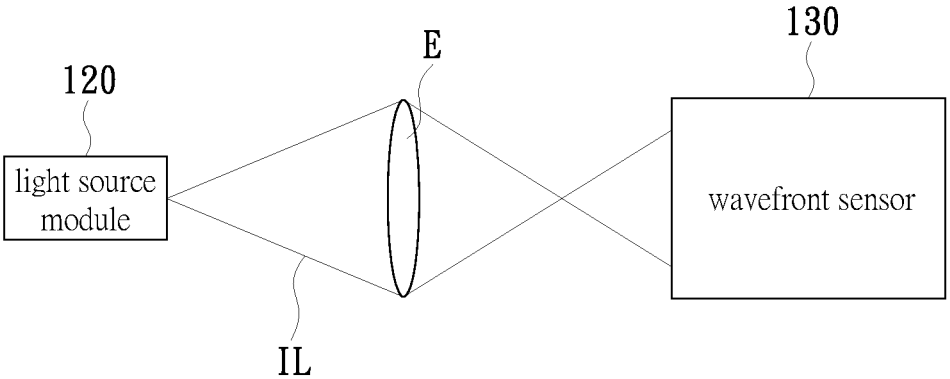
FIG. 1 is a diagram of the relationship among a light source module, an incident light beam and a wavefront sensor.

As shown in FIG. 1, high dynamic range wavefront measuring technology can be utilized to perform wavefront measuring by transmitting the incident light beam through the optics under test or reflecting upon the optics under test. Although this technology can be directly used to measure aspherical wavefronts, when measuring the optics under test, the alignment error aberration of the wavefront sensor (130 in FIG. 1), the displacement error of the optics under test, an alignment error aberration of the light source module (120 in FIG. 1) and the like will all lead to a significant error of measured wavefront phase. Therefore, a precise alignment between the wavefront sensor, the optics under test, and the light source module is required before measurement. However, the precise alignment among the wavefront sensor, the optics under test, and the light source module is usually the most difficult step to perform in measurement. In presence of positioning error, the alignment wavefront phase error generated during measurement may result in significant measurement error or uncertainty.

Under the influence of the optical alignment error, an aberration W measured by a wavefront sensor can be expressed by the following Equation 1, where $W_{WFS}$ is the alignment error aberration of the wavefront sensor, $W_{PLS}$ is the alignment error aberration of the incident light beam, and $W_{LENS}$ is the aberration of the optics under test, which is the wavefront phase as the goal to be tested.

$$W=W_{WFS}=W_{PLS}+W_{LENS} \quad\quad \text{Equation 1:}$$

To address the misalignment problems, a novel approach is proposed that utilizes the directional property of the tilt aberration and coma aberration generated by misalignment. An experienced person in the field knows that the primary axis of misalignment induced aberration is parallel to the direction of the misalignment. By rotating the optics under test, the direction of its aberration will rotate with it, allowing for further separation from the fixed directional aberration of the alignment error that is related with the system misalignment.

Zernike polynomial is a mathematical expression used to quantify the wavefront in terms of finite number of polynomials coefficients. The coefficients Cn of its Zernike polynomial Zn may be determined from measured data of the wavefront sensor using the least square fitting method. Considering that the optics under test to be measured subjected to rotational measurement, this coefficient is also a function of an azimuthal angle ($\Theta$), that is, $C_n(\Theta)$, and the aberration equation under the azimuthal angle ($\Theta$) is then expressed in Equation 2.

$$W(\theta) = \sum_{n=1}^{35} C_n(\theta) \times Z_n \quad\quad \text{Equation 2}$$

In Zernike polynomials, each non-symmetric Zernike term has its conjugate in different directions. For example, X and Y directions of the tilt aberration mentioned above are $Z_1$ and $Z_2$, and Zernike term orders of the coma aberration in the X and Y directions are $Z_6$ and $Z_7$. By using the orthogonality of Zernike polynomials, the tilt aberration and the coma aberration of the previous Equation 2 at each different measurement angle $\Theta$ can be rewritten as the following Equation 3 and Equation 4 respectively.

$$W(\theta)_{Tilt}=C_1(\theta)\times Z_1+C_2(\theta)\times Z_2 \quad\quad \text{Equation 3:}$$

$$W(\theta)_{Coma}=C_6(\theta)\times Z_6+C_7(\theta)\times Z_7 \quad\quad \text{Equation 4:}$$

Figure 2:
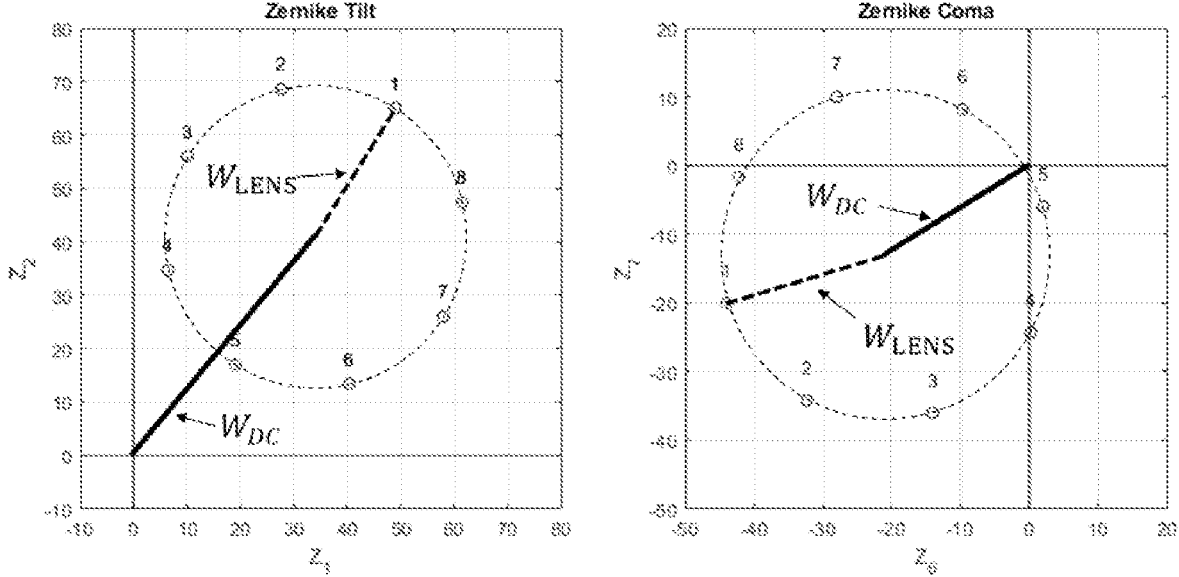
FIG. 2 is a diagram of signal separation between the system and an optics under test.

As shown in FIG. 2, corresponding Zernike coefficients of the tilt and the coma aberration acquired at eight different azimuthal directions can be plotted on two separated graphs. With the directional property of aberration, coordinates of the eight measurement Zernike coefficients form a circle, which represents the aberration of the optics under test at different azimuthal angles. The above relationship can be expressed by the following Equation 5, where W is an aberration measured by the wavefront sensor, $W_{DC}$ is a fixed alignment error aberration determined by the misalignment error aberration of the light source module ($W_{PLS}$) and the wavefront sensor ($W_{WFS}$) in Equation 1, $W_{LENS}$ is an aberration of the optics under test, and $\theta$ is an azimuthal angle of the optics under test. With this equation, after obtaining several measurement data points, the aberration of the optics under test can be obtained by fitting a circle using the least square method.

$$W(\theta)=W_{DC}+W(\theta)_{LENS} \qu\quad \text{Equation 5:}$$

It is worth mentioning that under this measurement framework, a reference wavefront phase ($W_r$) of the optics under test and its related ray slopes can be obtained by using different numerical simulation methods such as ray tracing or diffraction wave simulation, and a measured wavefront phase is compared with a reference wavefront phase generated by simulation, and the difference ($W-W_r$) represents the) wavefront error. If the optics under test is an optical lens, the rotated aberration represents the optical aberration caused by the decentration of the optical lens. Further, the change of wavefront phase ($\Delta W_{Ref}$) due to the unit decentration ($\Delta h$) can be calculated during ray tracing, and this change can be used to estimate the amount of decentration (dH) of the optics under test represented by the measured wavefront (W), as described by the following equation.

$$dH=(W-W_r)/\Delta W_{Ref}*\Delta h \quad\quad \text{Equation 6:}$$

In addition, before wavefront measurement is performed, relative positions of the wavefront sensor, the optics under test and the light source module in the optical axis direction, that is, so-called optical conjugate positions, must be determined. In order to achieve the optimal measurement performance, in addition to that the incident light beam fills the clear aperture of the optics under test as much as possible and its transmitted testing light beam falls in the dynamic range of the wavefront sensor, the testing light beam must also fill the lenslet on the micro lens array of the wavefront sensor as much as possible. By increasing the number of lenslet for wavefront sampling to achieve the highest sensitivity, or by finding a position that can get better decentration measurement sensitivity, this position is the best conjugate position. In details, the ray trace method can be applied to determine the marginal ray height in the micro lens array plane to get the testing optical beam fill the lenslet to maximum without vignetting or any beam caustic crossing.

In addition, when the conjugate position for measurement is determined, the numerical aperture of the incident light beam will also be determined. When the numerical aperture of the incident light beam in actual measurement is greater than the design nominal, the incident light beam will propagate beyond the clear aperture of the optics under test and may induce stray light issue, resulting in degradation of the measurement quality of the Hartmann spot. When the numerical aperture is smaller than the design nominal, the light beam measured by the wavefront sensor after passing through the optics under test will become smaller, causing the tested aperture of the optics under test underfilled, In severe cases, this can even result in a decrease in the accuracy and repeatability of the measurements. Therefore, it needs to design an aperture at the place of the light source module to control the numerical aperture of the incident light beam.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3:
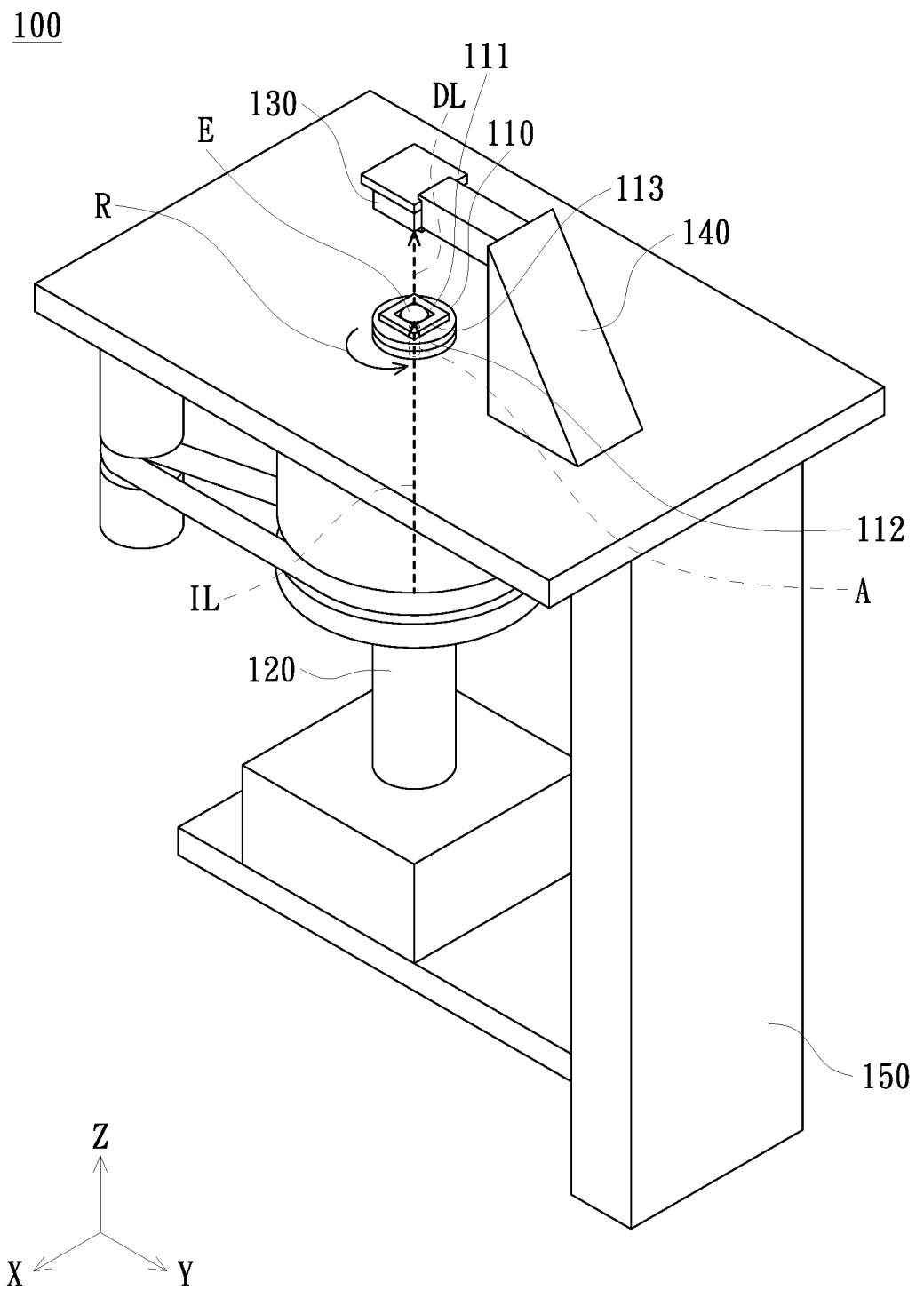
FIG. 3 is a schematic diagram of a rotational spindle, a light source module and a wavefront sensor of an optical wavefront measuring device according to an embodiment of the invention.

FIG. 3 is a schematic diagram of a rotational spindle, a light source module and a wavefront sensor of an optical wavefront measuring device according to an embodiment of the invention. Referring to FIG. 3, the optical wavefront measuring device 100 is designed to measure an optics under test E. The optical wavefront measuring device 100 includes a rotational spindle 110, a light source module 120 and a wavefront sensor 130. The rotational spindle 110 is designed to load and rotate the optics under test E. The light source module 120 is designed to provide an incident light beam IL to be incident on the optics under test E and generate a testing light beam DL with optical aberration to exit from the optics under test E when the optics under test E is rotated. The wavefront sensor module 130 is designed to receive the testing light beam DL when the optics under test E rotates to a plurality of azimuthal directions different from each other. When the rotational spindle 110 rotates, the wavefront sensor 130 captures a plurality of camera frames with different exposures in each one of the azimuthal directions.

The optics under test E is, for example, a single lens. The single lens can be a spherical lens, an aspheric lens, a thick meniscus lens, an M-shaped lens, a plano-convex lens, a biconcave lens or a thin meniscus lens, etc. In addition, the optics under test E may be an optical lens module composed of multiple lenses. This can be a mobile phone lens, a camera lens or a lens assembly composed of multiple lenses.

Figure 4:
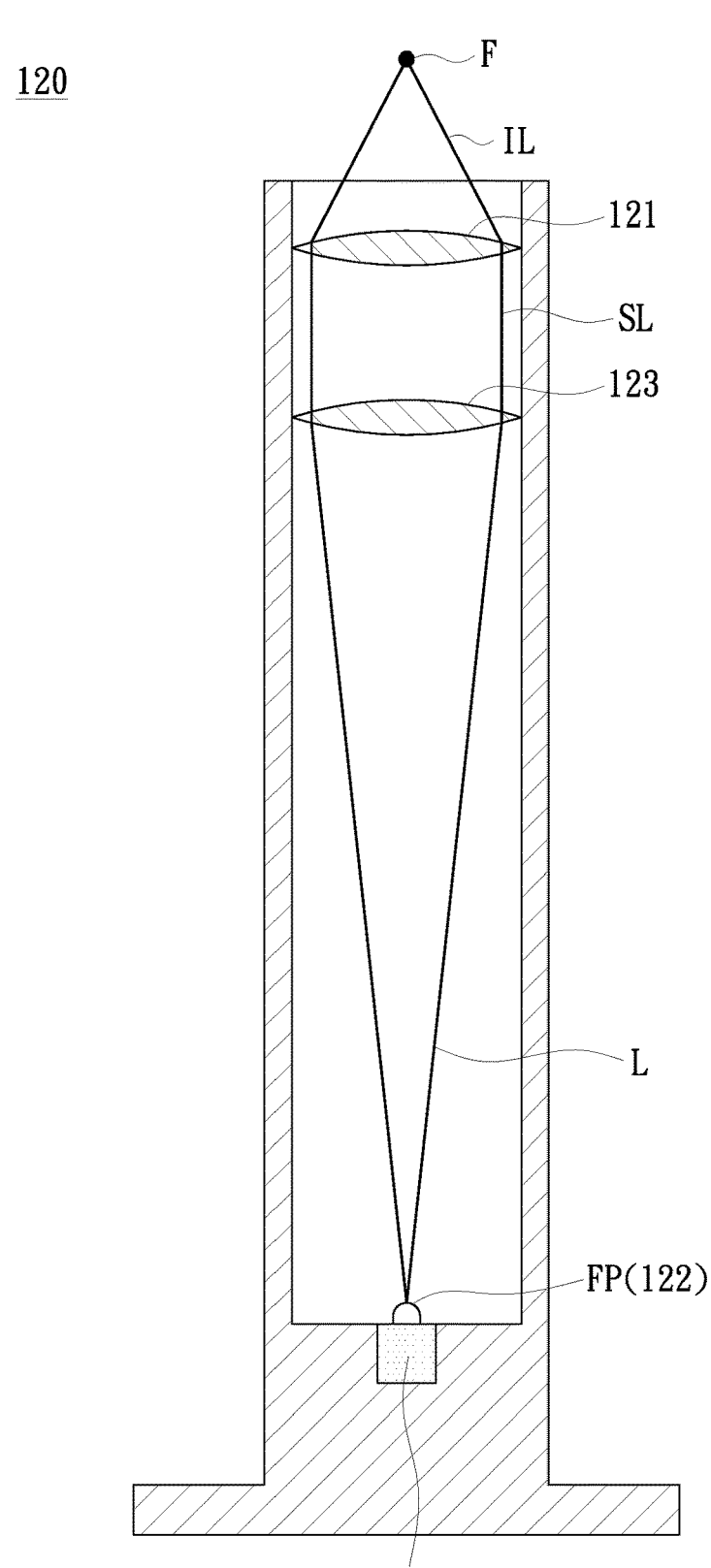
FIG. 4 is a schematic sectional view of the light source module of FIG. 1.

FIG. 4 is a schematic sectional view of the light source module of FIG. 3. Referring to FIGS. 3 and 4 together, in this embodiment, the light source module 120 includes, for example, a light source beam SL and a converging lens 121. The converging lens 121 is placed between the light source beam SL and the optics under test E. The converging lens 121 converges the incident light beam IL to a focal point F. This focal point F is then served as the point light source generating spherical wavefront incident upon the optics under test E. To precise control the wavefront radius of curvature of the incident light beam IL upon the optics under test E, the distance between the focal point F and the optics under test E has to be pre-determined precisely before the measurement. One can determine the said relative distance, for example, with the knowledge of the focal length of the converging optics and the converger lens position. Wherein the focal length of the converging lens can be determined and the light source module translation stage 150 can determine the location of the converging lens 121 along the stage that is parallel to the optical axis of the optics under test E. Further related steps will be described in detail in the following paragraphs.

With continued reference to FIG. 4, the light source beam SL in this embodiment may be generated by a point light source 122 generating a divergent light beam L to pass through a collimator 123, wherein the point light source 122 is, for example, a fiber pigtail (FP). The collimator 123 is disposed between the converging lens 121 and the fiber pigtail (FP). In detail, the converging lens 121 is placed between the point light source 122 and the optics under test E, and the light source module 120 may further include a collimator 123 and an optical fiber OF, wherein the optical fiber OF is coupled to a light emitting element (not shown) to form the point light source 122 at the fiber pigtail (FP). The collimator 123 in this embodiment can collimate the divergent light beam L. Further, if the fiber pigtail (FP) is placed at the focal point of the collimator 123, the collimator 123 can collimate the light source beam SL before incident upon the converging lens 121, so that the focus of the incident light beam IL is the focal point of converging lens 121. With this optical conjugate design, the optical aberration of both the collimator 123 and converging optics 121 can be minimized reducing the uncertainty of the wavefront measured. Also, the converging lens 121 can be modularized for the various focal length and the numerical aperture combinations. Incidentally, the light emitting element may include a laser light emitting element, such as a laser diode, and the divergent light beam L exiting from the point light source 122 may be a laser beam, but other embodiments are not limited to this.

Figure 5:
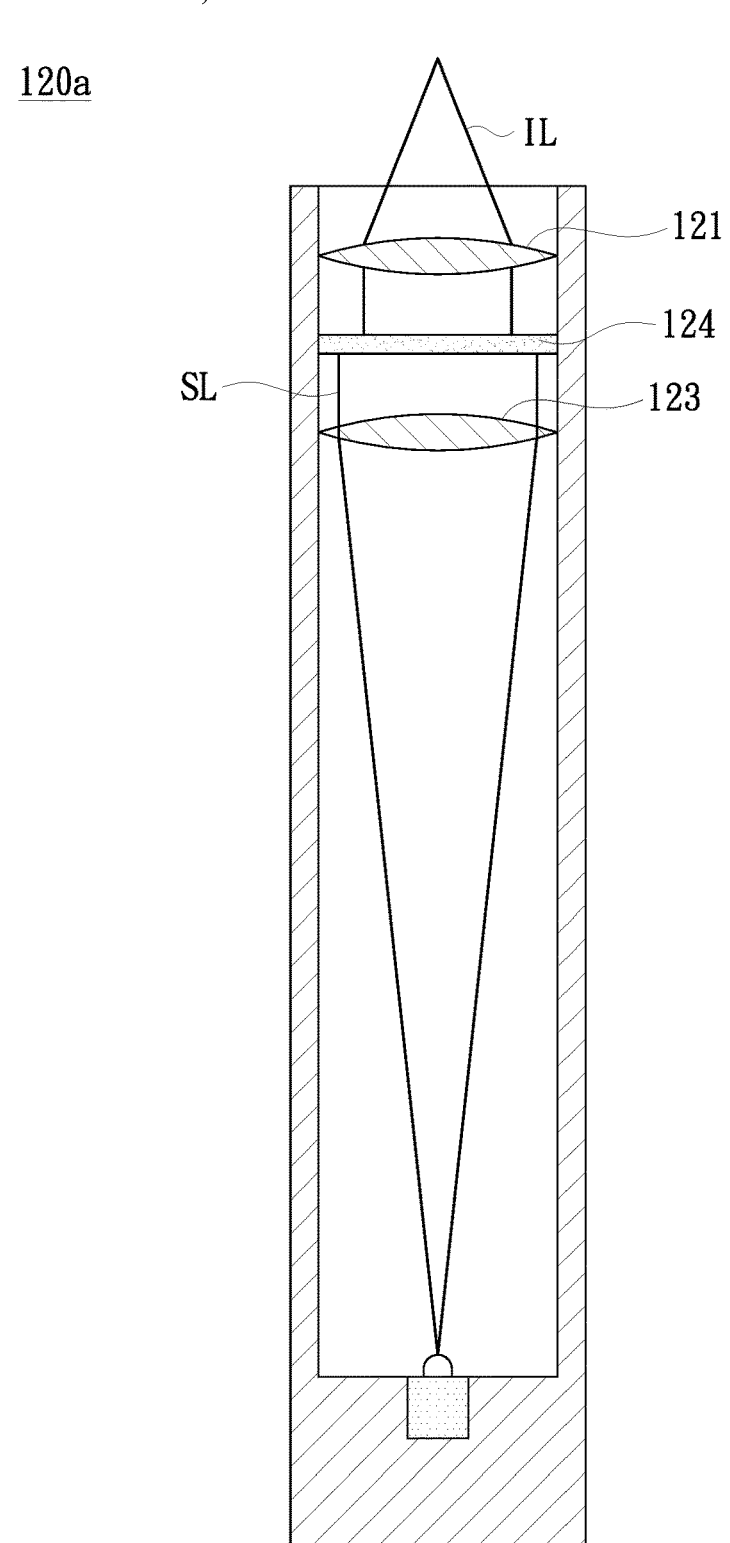
FIG. 5 is a schematic sectional view of a light source module of an optical wavefront measuring device according to another embodiment of the invention.

FIG. 5 is a schematic sectional view of a light source module of an optical wavefront measuring device according to another embodiment of the invention. It can be understood that the light source module 120 may be configured with other types of optics under test besides the converging lens 121 and the collimator 123. For example, referring to FIG. 5, the light source module 120a may further include an aperture 124. The aperture 124 is, for example, disposed between the collimator 123 and the converging lens 121. Specifically, the aperture 124 may reduce the diameter of the light source beam SL. It can be understood that in other embodiments, the position of the aperture 124 is not limited to be placed between the collimator 123 and the converging lens 121. For example, referring to FIG. 3 and FIG. 5 together, in one embodiment, the aperture 124 may be disposed between the converging lens 121 and the optics under test E; in other words, the aperture 124 may be located on a transmission path of the incident light beam IL. In another embodiment, the aperture 124 may be an opening of the lens holder 111 of the rotational spindle 110, and the lens holder 111 is adapted to load the optics under test E.

With continued reference to FIG. 3, the rotational spindle 110 of this embodiment may be driven to rotate by a belt and a motor, but the method of driving the rotational spindle 110 is not limited by the invention. When the measurement is taken at different azimuthal directions, the optics under test E has to be aligned with the rotational axis of the rotational stage 112 such that the measured aberration at different azimuthal directions will not change due to the misalignment error aberration. Therefore, an alignment device is required to accomplish the alignment task. In this embodiment, the rotational spindle 110 includes, for example, a rotational stage 112, a translation stage 113, and a lens holder 111. The translation stage 113 is placed on the rotational stage 112. The rotational stage 112 is configured to rotate the translation stage 113 to rotate along its rotation axis A. The lens holder 111 is placed on the translation stage 113 and is designed to load the optics under test E. The translation stage 113 is designed to drive the lens holder 111 to move along the first direction X and the second direction Y, and the first direction X and the second direction Y are perpendicular to the rotation axis A and each other. In short, the translation stage 113 may move the optics under test E to the transmission path of the incident light beam IL (shown in FIG. 4). In addition, the rotational stage 112 may rotate the translation stage 113 along the rotation direction R or the direction opposite to the rotation direction R, and then rotate the optics under test E to the different azimuthal directions.

To accomplish the measurement while minimizing the misalignment aberration induced from the wavefront sensor 130 or the light source module, both the wavefront sensor 130 and the light source module 120 have to be aligned to the rotational spindle 110 such that both the optical axis of the wavefront sensor and the light source module are coincident with the rotation axis A of the rotational spindle 110. In the preferred embodiment, the optical wavefront measuring device 100 may further include the wavefront sensor translation stage 140 and the light source module translation stage 150. The wavefront sensor translation stage 140 is connected to the wavefront sensor 130 and is designed to drive the wavefront sensor 130 to move along the first direction X, the second direction Y and the third direction Z. The rotation axis A of the rotational spindle 110 is parallel to an optical axis of the optics under test E. The third direction Z is configured as parallel to the rotation axis A, and the first direction X and the second direction Y are configured as perpendicular to the rotation axis A and each other. The light source module translation stage 150 is connected to the light source module 120 and is designed to drive the light source module 120 to move along the first direction X, the second direction Y and the third direction Z. Incidentally, in one embodiment, the wavefront sensor translation stage 140 may also be equipped with a tilt stage (not shown), and the tilt stage can control the wavefront sensor 130 to tilt relative to an X-Y plane.

Figure 6:
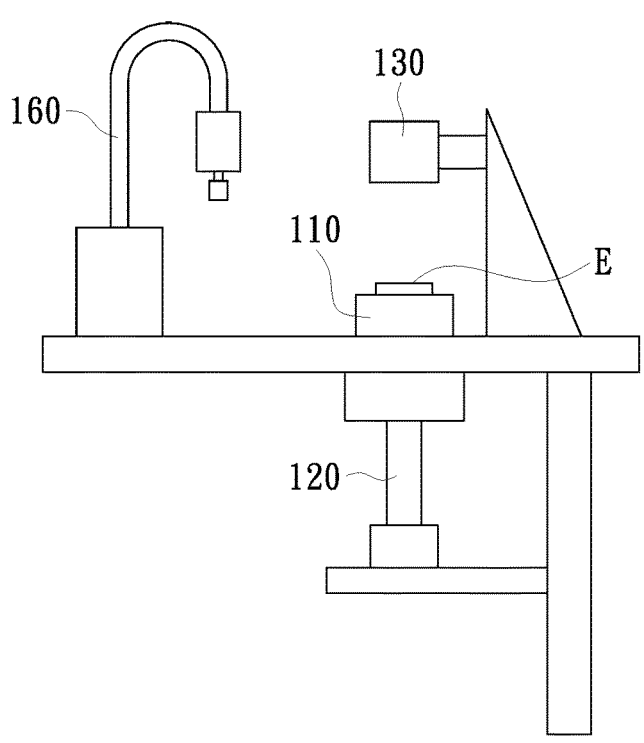
FIG. 6 is a schematic diagram of the rotational spindle, the light source module and the wavefront sensor of FIG. 1 equipped with a robotic arm.

FIG. 6 is a schematic diagram of the rotational spindle, the light source module and the wavefront sensor of FIG. 3 equipped with a robotic arm. Referring to FIG. 6, in this embodiment, the optical wavefront measuring device 100 further includes, for example, a robotic arm 160, and the robotic arm 160 is designed to pick and place the optics under test E. In detail, the robotic arm 160 can pick and place the optics under test E quickly. For example, in one embodiment, the robotic arm 160 may include a four-axis SCARA mechanical robot arm (also known as a four-axis selective compliant assembly mechanical arm), which has better position precision.

Figure 7:
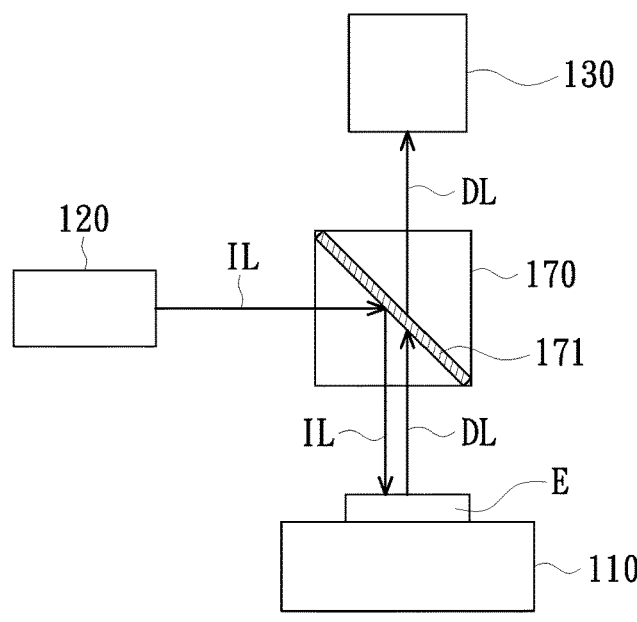
FIG. 7 is a schematic diagram of an optical wavefront measuring device according to another embodiment of the invention.

FIG. 7 is a schematic diagram of an optical wavefront measuring device according to another embodiment of the invention. The structures of the optical wavefront measuring device 100a of this embodiment are the same as those of the embodiment of FIG. 3, designed to measure the optical wavefront reflected on a mirror surface or highly reflective surface, and the differences are described below. Referring to FIG. 7, the optical wavefront measuring device 100a may further include a beam splitter module 170. The beam splitter module 170 is designed to be placed between the optics under test E and the wavefront sensor 130, and located on the optical path of the incident light beam IL. The beam splitter module 170 is designed to reflect the incident light beam IL to the optics under test E, and the incident light beam is reflected to form the testing light beam DL. The testing light beam DL passes through the beam splitter module 170 and then is acquired by the wavefront sensor. Specifically, the beam splitter module 170 may include a beam splitter 171, wherein the beam splitter 171 is located on the optical path of the incident light beam IL and can reflect the incident light beam IL to the optics under test E. In addition, the testing light beam DL passes through the beam splitter 171, so that the testing light beam DL propagates to the wavefront sensor 130.

FIG. 8 is a flow diagram of an optical wavefront measuring method according to an embodiment of the invention. FIG. 9 is a schematic diagram of an optical wavefront measuring device suitable for the optical wavefront measuring method of FIG. 8. Referring to FIG. 8 and FIG. 9 together, the optical wavefront measuring method may be applied to the optical wavefront measuring device 100 or 100a, and this embodiment takes the optical wavefront measuring device 100 as an example. The optical wavefront measuring method comprises the following steps to accomplish the measurement. First, referring to step S1: moving the light source module 120 to a first pre-determined position and moving the wavefront sensor 130 to a second pre-determined position. In detail, the first pre-determined position may be determined according to a first distance D1 between the focal point F (shown in FIG. 4) and the lens holder 111, and the second pre-determined position may be determined according to a second distance D2 between the surface S of the optics under test E and the wavefront sensor 130. After moving the light source module 120 to the first pre-determined position and moving the wavefront sensor 130 to the second pre-determined position, refer to step S2: providing the incident light beam IL from the light source module 120 to be incident on the optics under test E. When the optics under test E is rotated to a plurality of azimuthal directions different from each other by the rotational spindle 110 (shown in FIG. 3), a testing light beam DL (shown in FIG. 3) exiting from the optics under test E rotated to the plurality of azimuthal directions different from each other is generated. The testing light beam DL is received and a plurality of camera frames with different exposures are obtained by the wavefront sensor 130. After obtaining the plurality of camera frames with different exposures, refer to step S3: obtaining a measured image from the camera frames and generating a measured wavefront phase or measured ray slopes from the measured image, wherein the measured wavefront phase and the measured ray slopes correspond to the different azimuthal directions. Further, the measured image may be synthesized from the camera frames.

FIG. 10 is a flowchart of step S3 of the optical wavefront measuring method of FIG. 8. FIG. 11 is a flow diagram of step S3 of an optical wavefront measuring method according to another embodiment of the invention. Referring to FIG. 8 and FIG. 10 together, further, when step S3 of FIG. 8 is performed, the optical wavefront measuring method may include step S31 of FIG. 10: camera frames with different exposures may be achieved by modulating a light intensity of the incident light beam of the light source module. In detail, the modulating the light source module may provide incident light beams with different light intensities to pass through optics under test in different azimuthal directions, to further form testing light beams with different light intensities for the wavefront sensor to receive and generate camera frames with different exposures. Referring to FIG. 8 and FIG. 11, in another embodiment, when step S3 of FIG.

8 is performed, the optical wavefront measuring method may include step S32 of FIG. 11: camera frames with different exposures may be obtained by setting the wavefront sensor to capture the camera frames with different shutter times. Specifically, the wavefront sensor may be connected to a shutter module, wherein the shutter module can change the exposure time of the wavefront sensor, thereby changing the intensity of the testing light beam received by the wavefront sensor. In this way, the wavefront sensor generates camera frames with different exposures in different exposure duration time.

FIG. 12 is a flow diagram of an optical wavefront measuring method according to another embodiment of the invention. The steps of the optical wavefront measuring method of this embodiment are similar to the embodiment of FIG. 8, and only the differences will be described below. Referring to FIG. 8 and FIG. 12, after step S1 of FIG. 8, the optical wavefront measuring method may further include step S21 in FIG. 12: aligning the optical axis of the optics under test E with the rotation axis A of the rotational spindle 110. The optical axis and the rotation axis A are both parallel to the third direction Z (shown in FIG. 3), and the translation stage then can move the optics under test along the first direction X and the second direction Y (both shown in FIG. 3), so that the optical axis of the optics under test E is aligned with the rotation axis A of the rotational spindle 110. The characteristics of the translation stage have been described in the foregoing, so related description is omitted here.

FIG. 13 is a flow diagram of an optical wavefront measuring method according to another embodiment of the invention. The steps of the optical wavefront measuring method of this embodiment are similar to the embodiment of FIG. 8, and only the differences will be described below. Referring to FIG. 8 and FIG. 13, before step S1 of FIG. 8, that is, before moving the light source module to the first pre-determined position and moving the wavefront sensor to the second pre-determined position, the optical wavefront measuring method may further include the following steps. Refer to step S01 of FIG. 13: analyzing and determining an optimum optical conjugate position according to a design prescription of the optics under test by ray tracing software. In detail, the ray tracing software may be performed by a computing device, and the computing device includes, for example, a server, a desktop computer or a notebook computer, but the invention is not limited to this. In this embodiment, after determining the optimum optical conjugate position, refer to step S02: determining the first pre-determined position and the second pre-determined position of the light source module and the wavefront sensor relative to the optics under test E in the third direction Z according to the optimum optical conjugate position, wherein the first pre-determined position corresponds to the light source module and the second pre-determined position corresponds to the wavefront sensor. Further, the third direction is parallel to the optical axis of the optics under test, and is, for example, the third direction z shown in FIG. 3. Additionally, the computing device is configured to perform aberration separation by processing the measured wavefronts as described herein, including determining and subtracting the fixed alignment error aberration ($W_{DC}$) attributable to device misalignment from the measured wavefronts, such as via Zernike polynomial fitting according to Equations 2-5.

FIG. 14 is a flowchart of step S01 of the optical wavefront measuring method of FIG. 13. Referring to FIG. 13 and FIG. 14 together, further, in step S01 of FIG. 13, when determining the optimum optical conjugate position according to the design prescription of the optics under test by the ray tracing, the optical wavefront measuring method may include the following steps. Refer to step S011 of FIG. 14: generating a reference wavefront phase or a reference ray slope by raytracing the optical prescription of the optics under test to the surface plane as the micro lens array plane of the wavefront sensor. Furthermore, the micro lens array plane of the wavefront sensor receives the testing light beam and generates the measured wavefront phase or the measured ray slope according to the testing light beam. More specifically, the measured optical phase is compared with the reference wavefront phase, and the measured ray slope is compared with the reference ray slope. Incidentally, in other embodiments, the number of both the reference wavefront phases and reference ray slopes may be plural.

Figure 15:
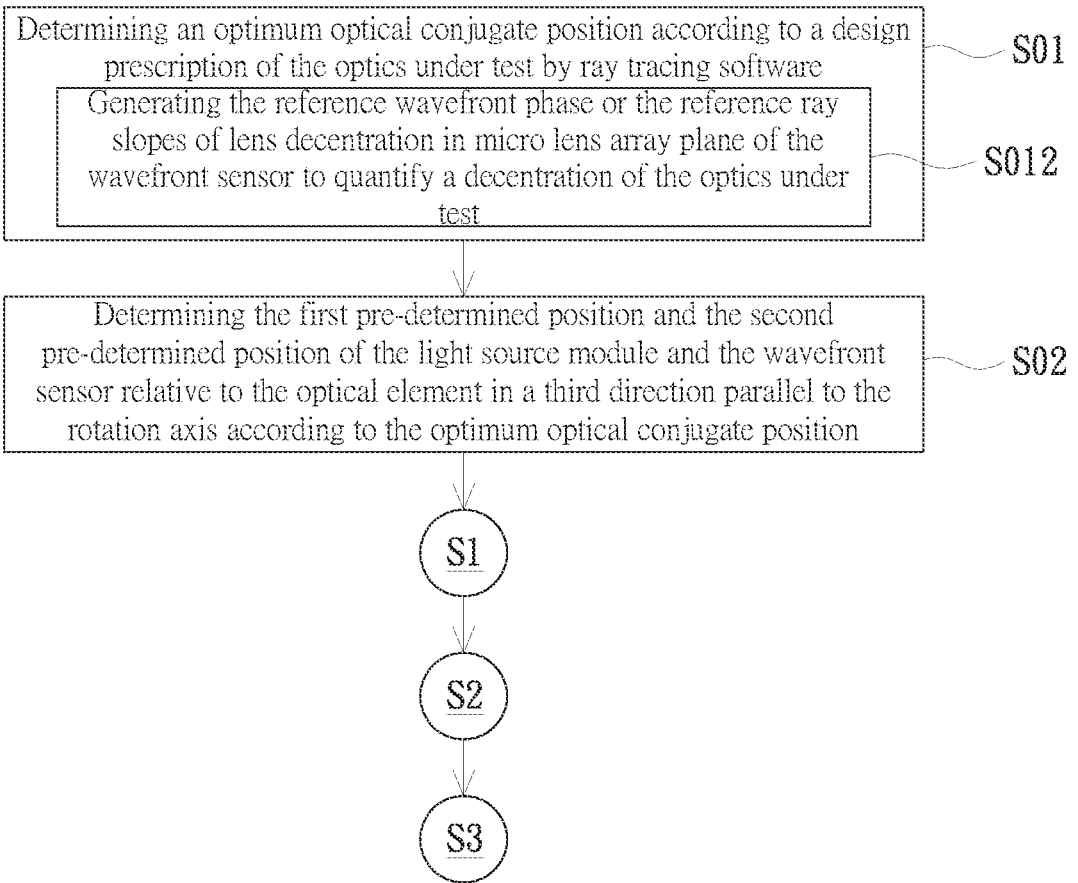
FIG. 15 is a flow diagram of step S01 of an optical wavefront measuring method according to another embodiment of the invention.

FIG. 15 is a flow diagram of step S01 of an optical wavefront measuring method according to another embodiment of the invention. Referring to FIG. 13 and FIG. 15, in another embodiment, when step S01 of FIG. 13 is performed, the optical wavefront measuring method may include step S012 of FIG. 15: generating the reference wavefront phase or the ray slopes of a unit lens decentration in the micro lens array plane of the wavefront sensor to quantify a decentration of the optics under test. In detail, the relation is shown in above-mentioned Equation 6.

FIG. 16 is a flow diagram of an optical wavefront measuring method according to another embodiment of the invention. The steps of the optical wavefront measuring method of this embodiment are similar to the embodiment of FIG. 13, and only the differences will be described below. Referring to FIG. 13 and FIG. 16 together, after step S01 of FIG. 13, the optical wavefront measuring method may further include the following steps. Refer to step S013 of FIG. 16: determining a numerical aperture of the incident light beam according to the optimum optical conjugate position of the optics under test, selecting an appropriate converging lens or an aperture placed between a point light source and the optics under test through the numerical aperture, and adjusting the first pre-determined position of the converging lens in the third direction parallel to the rotation axis according to the optimum optical conjugate position. The characteristics of the converging lens and the aperture have been described in detail in the foregoing, so related description is omitted here.

FIG. 17 is a flowchart of step S21 of the optical wavefront measuring method of FIG. 12. The steps of the optical wavefront measuring method of this embodiment are similar to the embodiment of FIG. 12, and only the differences will be described below. Referring to FIG. 12 and FIG. 17 together, in step S21 of FIG. 12, the optical wavefront measuring method may include step S211 of FIG. 17: driving the lens holder to move along the first direction and the second direction by the translation stage, the first direction and the second direction being perpendicular to the rotation axis and each other. The translation stage, the rotation axis, the first direction and the second direction have already been described in the foregoing, so related description is omitted here.

Compared with the prior art, the optical wavefront measuring method in this embodiment is suitable for the optical wavefront measuring device described above, so that the aberrated wavefront of the optics under test can be measured without using CGH or null optics.

To sum up, the optical wavefront measuring device of the invention adopts the rotational spindle to rotate the optics under test to the plurality of azimuthal directions different from each other, uses the wavefront sensor to capture a plurality of camera frames of the optics under test with different exposures in each one of the azimuthal directions, and synthesizes the camera frames into a measured image through HDR imaging. In other words, the optical wavefront measuring device of the invention measures the wavefront exiting from the optics under test by combining the measured images of HDR imaging and azimuthal angle rotation wavefront acquisition method, where the characteristics of the Hartmann spots can be obtained more accurately from the high dynamic range synthesized image than a conventional measured image of a single exposure frame, and measured images in different azimuthal directions can be used to separate the wavefront of the optics under test from the wavefront error caused by system alignment. Therefore, the proposed optical wavefront measuring device of the invention can measure the wavefront of the optics under test with better accuracy and more flexibility.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical wavefront measuring device for testing an optics under test, the optical wavefront measuring device comprising:

a rotational spindle rotating the optics under test in a plurality of different azimuthal directions;

a light source module emitting an incident light beam that propagates to the optics under test, from which testing light beam containing the measured wavefront of the optics under test is generated;

a wavefront sensor acquiring the testing light beam passing through the optics under test rotated in at least two of the plurality of different azimuthal directions; and a computing device processing data associated with the testing light beam;

wherein the wavefront sensor captures a plurality of camera frames with different exposures for each of the plurality of different azimuthal directions to acquire the testing light beam; and the camera frames with different exposures for each of the plurality of different azimuthal directions are synthesized into a measured wavefront corresponding to the respective azimuthal direction, the computing device is configured to receive the measured wavefronts obtained at the at least two azimuthal directions, determine, from the measured wavefronts, a fixed alignment error aberration ($W_{DC}$) attributable to misalignment of the optical wavefront measuring device, and subtract the fixed alignment error aberration ($W_{DC}$) from the measured wavefronts to obtain an angle-dependent aberration attributable to the optics under test.

2. The optical wavefront measuring device as claimed in claim 1, wherein the light source module comprises a light source beam and a converging lens, the converging lens is positioned between the light source beam and the optics under test, converging the incident light beam to a focal point, the relative distance between the focal point and the optics under test is predetermined by the design prescription of the optics under test.

3. The optical wavefront measuring device as claimed in claim 2, wherein a divergent light beam is collimated by a collimator forming the light source beam, the divergent light beam propagates from a point light source, the point light source is generated out of a fiber pigtail, and the collimator is placed between the converging lens and the fiber pigtail.

4. The optical wavefront measuring device as claimed in claim 1, further comprising a beam splitter module, wherein the beam splitter module is disposed between the optics under test and the wavefront sensor, and is located on a propagation path of the incident light beam, the beam splitter module redirects the incident light beam to the optics under test, and the incident light beam is reflected off the optics under test forming the testing light beam, the testing light beam is captured by the wavefront sensor after passing through the beam splitter module.

5. The optical wavefront measuring device as claimed in claim 3, wherein the light source module further comprises an aperture, the aperture is disposed between the collimator and the converging lens or between the converging lens and the optics under test, or the aperture is an opening of a lens holder of the rotational spindle, and the lens holder holds the optics under test.

6. The optical wavefront measuring device as claimed in claim 1, wherein the rotational spindle comprises a rotational stage, a translation stage and a lens holder, the translation stage is disposed on the rotational stage, the rotational stage has a rotation axis, the rotational stage rotates the translation stage to rotate along the rotation axis, the lens holder is disposed on the translation stage, and holds the optics under test, the translation stage moves the lens holder along a first direction and a second direction, the first direction and the second direction are perpendicular to the rotation axis and each other.

7. The optical wavefront measuring device as claimed in claim 1, further comprising at least one of a wavefront sensor translation stage and a light source module translation stage, wherein:

the wavefront sensor translation stage is connected to the wavefront sensor, and drives the wavefront sensor to move along a first direction, a second direction, and a third direction, wherein a rotation axis of the rotational spindle is parallel to the optical axis of the optics under test, the third direction is parallel to the rotation axis, the first direction and the second direction are orthogonal to the rotation axis and each other;

the light source module translation stage is connected to the light source module, and is adapted to drive the light source module to move along the first direction, the second direction, and the third direction.

8. The optical wavefront measuring device as claimed in claim 6, further comprising a robotic arm to pick and place the optics under test to the lens holder.

9. An optical wavefront measuring method suitable for an optical wavefront measuring device to test optics under test, the optical wavefront measuring device comprising a rotational spindle rotating the optics under test, a light source module, a wavefront sensor, and a computing device, the optical wavefront measuring method comprising:

moving the light source module to a first pre-determined position, and moving the wavefront sensor to a second pre-determined position;

providing an incident light beam incident on the optics under test by the light source module, and a testing light beam containing measured wavefront of the optics under test propagates out of the optics under test;

when the optics under test is rotated to a plurality of different azimuthal directions by the rotational spindle, the testing light beam passing through the optics under test rotated in at least two of the plurality of different azimuthal directions is acquired by the wavefront sensor; and capturing a plurality of camera frames with different exposures for each of the plurality of different azimuthal directions to acquire the testing light beam by the wavefront sensor;

wherein synthesizing the camera frames with different exposures for each of the plurality of different azimuthal directions into a measured wavefront corresponding to the respective azimuthal direction; and receiving the measured wavefront corresponding to the respective azimuthal direction, by the computing device;

determining a fixed alignment error aberration ($W_{DC}$) attributable to misalignment of the optical wavefront measuring device from the measured wavefront, by the computing device; and subtracting the fixed alignment error aberration ($W_{DC}$) from the measured wavefront to obtain an angle-dependent aberration component attributable to the optics under test, by the computing device.

10. The optical wavefront measuring method as claimed in claim 9, wherein the camera frames with different exposures are obtained by modulating a light intensity of the incident light beam of the light source module.

11. The optical wavefront measuring method as claimed in claim 9, wherein the camera frames with different exposures are obtained by configuring the wavefront sensor to capture the camera frames with different shutter times.

12. The optical wavefront measuring method as claimed in claim 9, wherein before the steps of when the optics under test is rotated to a plurality of different azimuthal directions by the rotational spindle, the testing light beam is acquired by the wavefront sensor at the plurality of different azimuthal directions, the optical wavefront measuring method further comprises aligning an optical axis of the optics under test with the rotation axis of the rotational spindle.

13. The optical wavefront measuring method as claimed in claim 9, the first pre-determined position and the second pre-determined position are determined by the method:

determining an optimum optical conjugate position according to a design prescription of the optics under test by ray tracing; and determining the first pre-determined position and the second pre-determined position of the light source module and the wavefront sensor relative to the optics under test in a third direction parallel to the rotation axis according to the optimum optical conjugate position.

14. The optical wavefront measuring method as claimed in claim 13, wherein when determining the optimum optical conjugate position according to the design prescription of the optics under test by the ray tracing method, the optical wavefront measuring method comprises:

generating a reference wavefront phase or a reference ray slope in the micro lens array plane of the wavefront sensor; or generating the reference wavefront phase or the reference ray slope according to the surface or elements decentration of the optics under test in the micro lens array plane of the wavefront sensor to quantify the decentration of surface or elements of the optics under test.

15. The optical wavefront measuring method as claimed in claim 13, wherein after the step of determining the optimum optical conjugate position according to the design prescription of the optics under test by the ray tracing method, the optical wavefront measuring method further comprises:

determining a numerical aperture of the incident light beam according to the optimum optical conjugate position of the optics under test, selecting an appropriate converging lens or an aperture to control the incident light beam convergence speed, and adjusting the first pre-determined position of the converging lens in the third direction parallel to the rotation axis according to the optimum optical conjugate position, using the computing device.

16. The optical wavefront measuring method as claimed in claim 15, wherein the rotational spindle comprises a lens holder, the lens holder holding the optics under test, the aperture is disposed between a collimator and the converging lens or between the converging lens and the optics under test, or the aperture is an opening of the lens holder.

17. The optical wavefront measuring method as claimed in claim 12, wherein the rotational spindle comprises a rotational stage, a translation stage and a lens holder, the translation stage is disposed on the rotational stage, the rotational stage has the rotation axis, and drives the translation stage to rotate along the rotation axis, the lens holder is disposed on the translation stage, and holding the optics under test, wherein the step of aligning the optical axis of the optics under test with the rotation axis of the rotational spindle comprises driving the lens holder to move along a first direction and a second direction by the translation stage, and the first direction and the second direction are perpendicular to the rotation axis and each other.

* * * * *